United States Patent
Pestoni et al.

(10) Patent No.: US 7,113,999 B2
(45) Date of Patent: Sep. 26, 2006

(54) METHOD, COMPUTER READABLE MEDIA AND APPARATUS FOR THE SELECTION AND RENDERING OF AUDIO FILES IN A NETWORKED ENVIRONMENT

(75) Inventors: Florian Pestoni, Mountain View, CA (US); Clemens Drews, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 09/929,606

(22) Filed: Aug. 14, 2001

(65) Prior Publication Data

US 2003/0037157 A1 Feb. 20, 2003

(51) Int. Cl.
*H06F 15/16* (2006.01)

(52) U.S. Cl. ............ 709/231; 709/223; 709/226; 709/245; 707/10; 345/327

(58) Field of Classification Search ........... 709/223, 709/231, 245, 226, 243; 707/10; 345/327; 725/93
See application file for complete search history.

(56) References Cited

U.S. PATENT DOCUMENTS

| | | | |
|---|---|---|---|
| 5,441,047 A | 8/1995 | David et al. | |
| 5,475,845 A | 12/1995 | Orton et al. | |
| 5,701,904 A | 12/1997 | Simmons et al. | |
| 5,718,233 A | 2/1998 | Selker et al. | |
| 5,724,983 A | 3/1998 | Selker et al. | |
| 5,740,549 A | 4/1998 | Reilly et al. | |
| 5,774,170 A | 6/1998 | Hite et al. | |
| 5,857,191 A | 1/1999 | Blackwell, Jr. et al. | |
| 6,002,393 A | 12/1999 | Hite et al. | |
| 6,029,045 A | 2/2000 | Picco et al. | |
| 6,050,940 A | 4/2000 | Braun et al. | |
| 6,112,181 A | 8/2000 | Shear et al. | |
| 6,115,040 A | 9/2000 | Bladow et al. | |
| 6,286,051 B1 | 9/2001 | Becker et al. | |
| 6,389,467 B1* | 5/2002 | Eyal | 709/223 |

OTHER PUBLICATIONS

U.S. Appl. No. 09/163,498, filed Sep. 30, 1998.
U.S. Appl. No. 09/928,347, filed Aug. 14, 2001.
Shardanand et al., "Social Information Filtering: Algorithms for Augomating 'Word of Mouth'", Proceedings of CHI '95, Conference on Human Factors in Computing Systems, ACM Press, vol. 1, p. 210-217, 1995.
http://www.launch.com/Corporate/pages/release_044.html.
Comdex—Data General's Numa for Major Multiprocessing, Newsbytes, pNEW11250015, Nov. 24, 1996.

* cited by examiner

*Primary Examiner*—Jeffrey Pwu
(74) *Attorney, Agent, or Firm*—Jose Gutman; Fleit, Kain, Gibbons, Gutman, Bongini & Bianco P.L.

(57) ABSTRACT

A networked virtual jukebox renders audible music or other audio files to all within audio range of the virtual jukebox. The order of rendering is determined by requesting methods, which include networked peer-voting input, recent play history, random selection and voting. Voting is received from each networked device in communication with the networked virtual jukebox using all types of input methods such as keyboard, mouse, and voice input. The networked virtual jukebox can also operate unattended by playing music and/or audio files based on random selection of past voting.

21 Claims, 9 Drawing Sheets

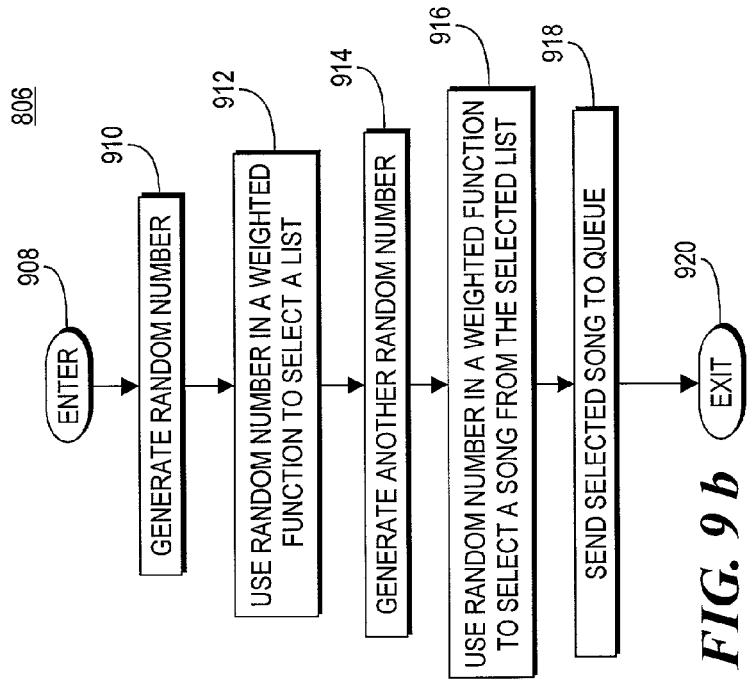
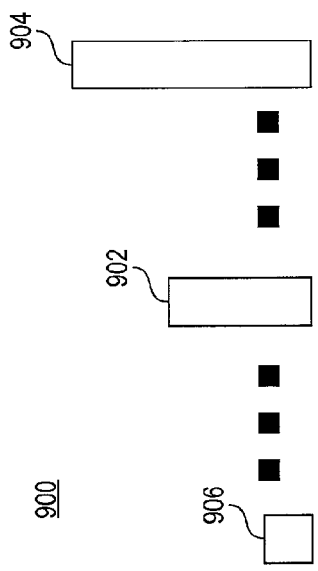
FIG. 9a
FIG. 9b
FIG. 9

US 7,113,999 B2

METHOD, COMPUTER READABLE MEDIA AND APPARATUS FOR THE SELECTION AND RENDERING OF AUDIO FILES IN A NETWORKED ENVIRONMENT

CROSS REFERENCE TO RELATED APPLICATIONS

The present patent application is related to co-pending and commonly-owned U.S. patent application Ser. No. 09/928,347, entitled "Collaborative Content Programming", filed on even date with the present patent application, the entire teachings of which being hereby incorporated by reference, and further is related to co-pending and commonly-owned U.S. patent application Ser. No. 09/163,498, entitled "Extensible Thin Server for Computer Networks", filed on Sep. 30, 1998, now abandoned, the entire teachings of which are hereby incorporated by reference.

BACKGROUND OF THE INVENTION

1. Field of the Invention

This invention generally relates to the field of networked audio file sharing and rendering, and more particularly relates to the selection, voting, scheduling, and rendering of audio files on a network in a shared listening environment.

This invention relates to the field of recorded music play back. More specifically, it is a method, a computer readable media, and apparatus for collaborative selection of audio playback of shared digital content. The invention allows multiple listeners to jointly decide what music to play in a shared space by indicating the location of digital files on a computer network. The invention can also be used by individual users to remotely program an audio file player. An example would be for a manager to schedule certain announcements at a particular time for all to hear at a given location.

2. Description of Related Art

Contemporary technology has brought forth such wonders as inexpensive and pervasive PCs, networks of computers connected together by networks such as the Internet. It is now possible to compress audio files using MP-3 (MPEG-1 Layer 3) compression and store them on a personal computer for deferred listening. In fact, it is possible to compose a play-list of personal favorites from different artists, assemble the audio files into a folder, and then send this to someone special.

Music File Sharing Networks

Referring to FIG. 1, shown is a block diagram 100, illustrating a prior art network, which makes possible all types of file sharing between users. A network 102, such as the Internet, connects servers 104 and clients 106 together for the mutual benefit of all. A music web "server" 108 contains lists of both clients and their individual listings of stored music files. These lists have been aggregated in such a way that they are searchable by several different parameters, such as by artist or title. Once a search is completed any matches are presented. In the case of several matches the user must select a single one based on such attributes as connection speed. Once selected the real URL (Uniform Resource Locator) is used to down load the music file, which is typically an MP3 file type. Note that the server 108 does not contain any music. Also connected to the network 102 is a Client 106 community. Clients 112, 114 and 116 represent the members of this music sharing community. They share available music files with each other, where the Server 104 provides a song title listing and search function. Also note that there is a music file server 110 that may be accessed, which provides music files from a "for profit" music publisher.

The popularity of audio file sharing groups is noted. They represent two issues. The clients are typically individuals at different locations. In addition where there is shared listening, the play list is really in the control of a given PC operator. In this situation the group of listeners are not able to make individual choices or votes for the play list. Accordingly there exists a need for the ability to vote as a group in a shared listening environment.

Another problem is the issue of ownership. Specifically song copyrights allow for the listening pleasure of individuals who bought a given song. This listening may be individually or in a shared acoustical environment. The ownership does not allow for wholesale copying or distribution of audio files, thus depriving the copyrighted song owners their revenue stream. Accordingly, there exists a need for enforcing the copyrights of the audio file owners, while enabling a shared listening environment.

Recordings of music have traditionally been distributed in physical media, including vinyl records, CDs (compact discs) and other media. With the widespread availability of computer networks other means for distributing digitally encoded music have become available, namely the transfer of this digital content over wired or wireless networks.

Original Jukeboxes

In the 1930s, musical Jukeboxes became popular. They allowed patrons in public places to select records and songs from a fixed list by pushing buttons corresponding to a desired song. In most cases, the right to select a song required paying a small amount of money. Jukeboxes contained several records, but were limited by the physical dimensions and the complexity of moving the records to a position where they could be played. The advent of digital media resulted in minor changes to the same concept, basically replacing the vinyl records for CDs and using the appropriate playback mechanism.

Referring to FIG. 2, block diagram 200 shows the prior art of a 1950s style musical Jukebox. The technology here was a vinyl record player. There is a lot of nostalgia associated with these boxes that were quite ornate with very stylized lights and chrome. In a restaurant or malt shop 206, some one would select a song from a list represented at the Jukebox 202. The Jukebox would play the selected song through the speakers 204 for all to hear. The play queue is as simple as the order of the patrons selecting the songs. This simple FIFO (First In First Out) queue worked well except if someone would "hog" the Jukebox by selecting lots of songs. Accordingly there exists the need to maintain this shared listening experience while enabling a more democratic song selection.

Diner Type of Jukeboxes

Turning now to FIG. 3, shown is a block diagram 300, of the prior art of an alternative style of 1950s Jukebox. In this configuration, perhaps a "diner" model, each table has a small chrome box, which contained flip pages of the available songs. People at each table 312, can select a song at the first Jukebox selector 302, or second 304 through the $N^{th}$ Jukebox selector 306, that are located at each table. Based on a FIFO queue, the songs would be played for all to hear by the central Jukebox 308 by the speakers 310. The advantage with this installation of Jukeboxes at each table is the convenience of making a selection. In addition, people at each table can discuss and perhaps vote on which songs to purchase. This technique of voting did not extend from table to table nor is the technology (vinyl records) viable any more.

Accordingly a need exists for a virtual Jukebox device for facilitating playback rendering of audio, such as songs, that is collectively selected and prioritized for playback by users.

The latest technology, including mechanisms for encoding music in digital format such as MP3, has enabled more efficient ways of managing and distributing audio records by compressing digital audio files such as used on CDs. Commercially available players such as the "Rio PMP300" from SonicBlue (formerly Diamond Multimedia Systems, Inc.,) implemented both in software and hardware, allow a user to listen to MP3 digitally encoded music. However, the form factors for these players are like a WalkMan®, where the main emphasis has been on individual rather than collaborative group use.

Accordingly there exists a need for utilizing the latest technology in a shared listening environment.

SUMMARY OF THE INVENTION

Briefly, according to a preferred embodiment of the present invention, a method, a system, and computer readable medium, are implemented for requesting audio files to be rendered in a shared acoustical environment. The request contains a pointer to the stored location of the requested file, or to the source of a streaming file. Audio file purchasing and copyright rules are optionally supported.

During the rendering of each of the audio files votes are accepted for or against the file and stored for use in a vote database. Once all requested audio files are rendered, the present invention will play files according to the voting popularity of the files. Optionally audio files can be scheduled according to time or certain events.

BRIEF DESCRIPTION OF THE DRAWINGS

FIG. 9a is a block diagram illustrating weighted lists of audio files that have been voted for and FIG. 9b is a flow diagram illustrating how audio files are selected from the weighted lists for auto play, according to an alternative preferred embodiment of the present invention.

DESCRIPTION OF THE PREFERRED EMBODIMENTS

Figure 1:
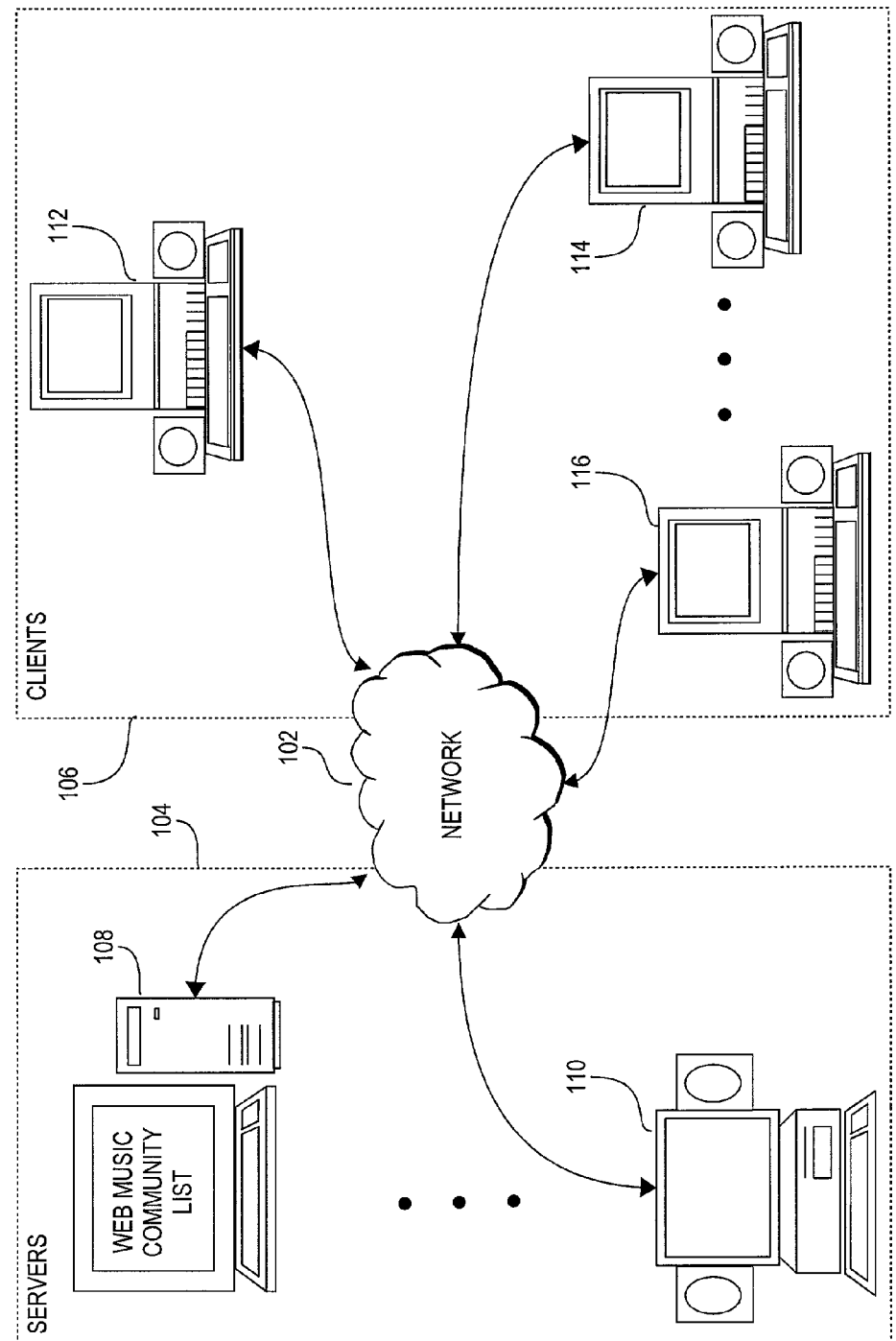
FIG. 1 is a block diagram illustrating a prior art network implementation for downloading audio files to networked computing devices.
Figure 2:
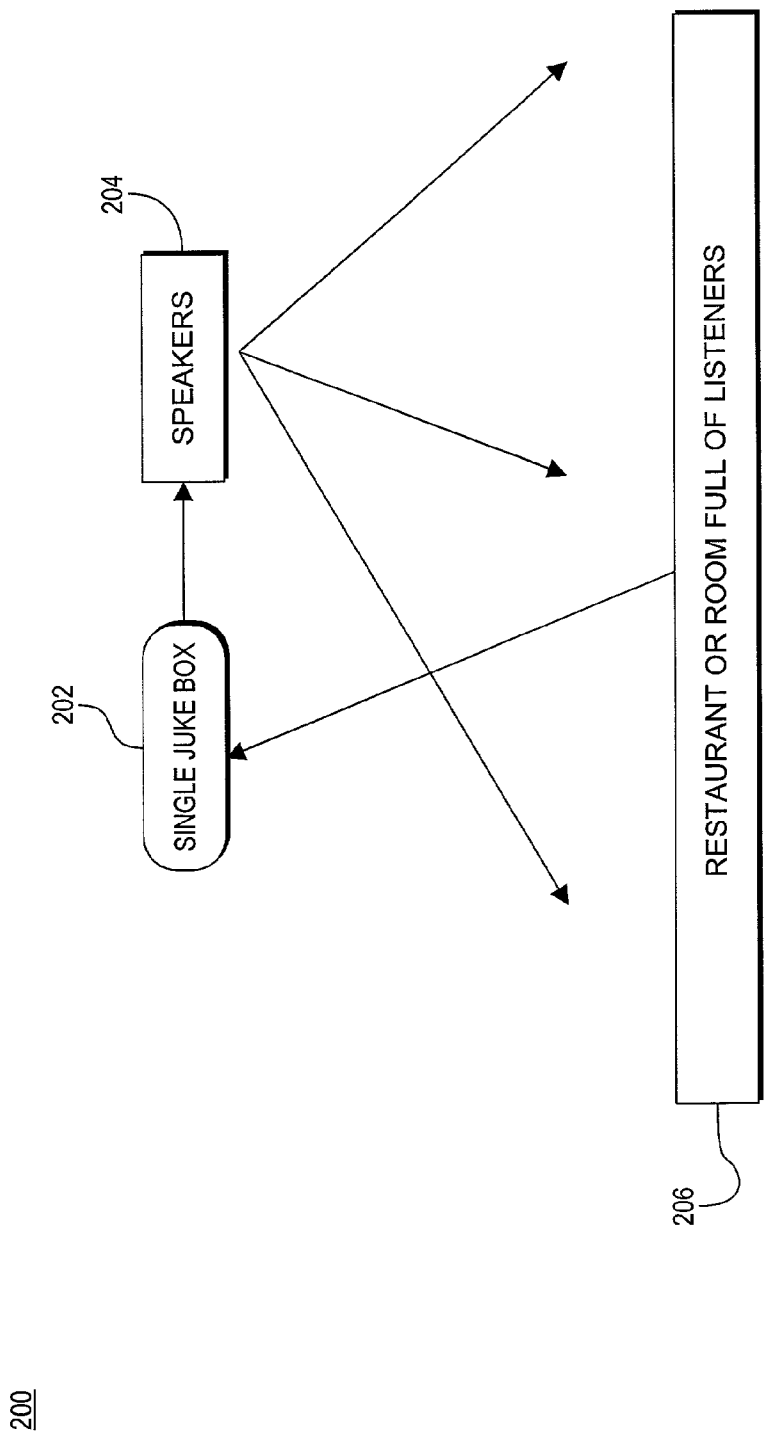
FIG. 2 is a block diagram illustrating a prior art Jukebox system.
Figure 3:
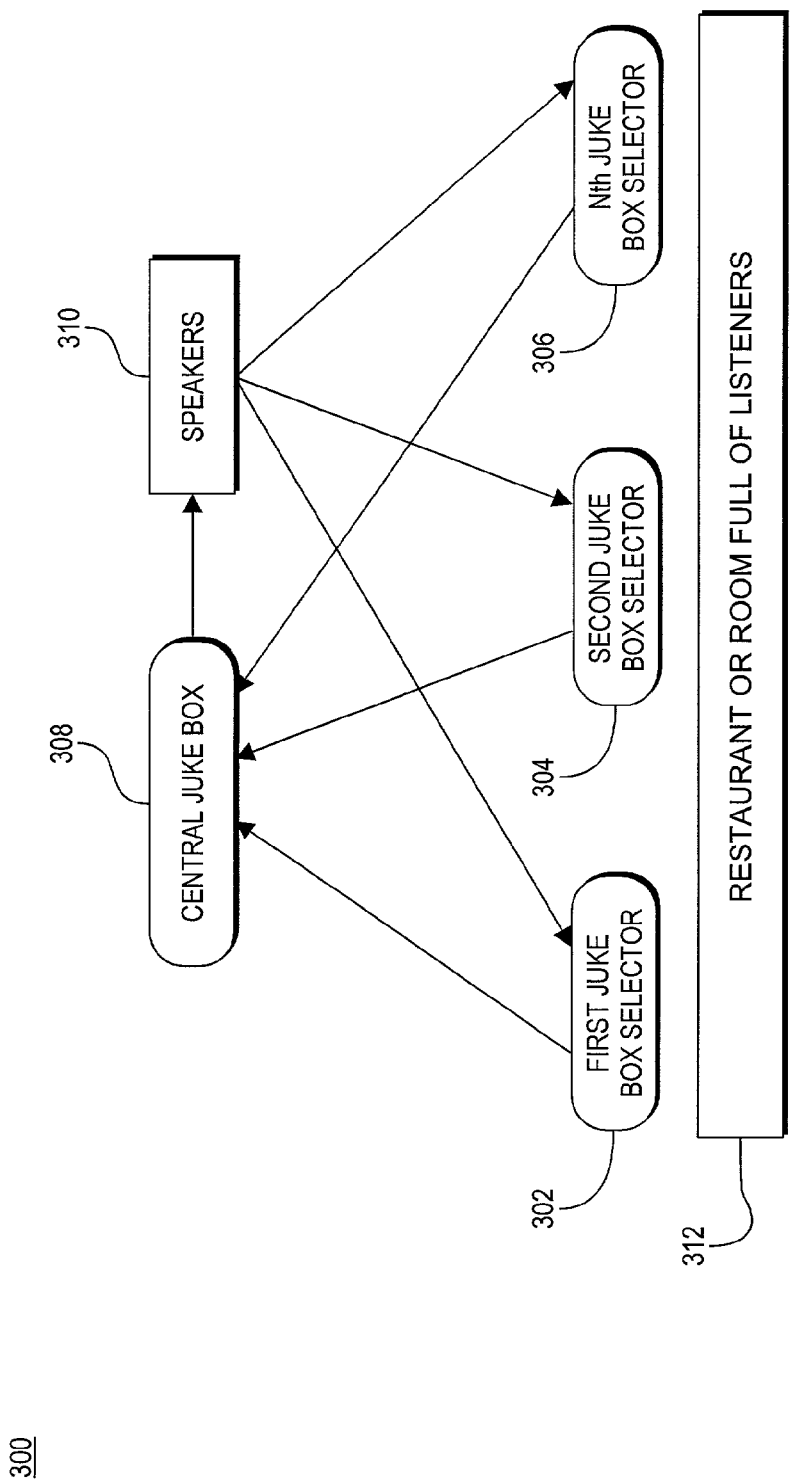
FIG. 3 is a block diagram illustrating an alternative prior art Jukebox system.

It is important to note that these embodiments are only examples of the many advantageous uses of the innovative teachings herein. In general, statements made in the specification of the present application are not intended to limit any of the various claimed inventions. Moreover, some statements may apply to some inventive features but not to others. In general, unless otherwise indicated, singular elements may be in the plural and visa versa with no loss on generality.

In the drawings like numerals refer to like parts through several views.

Discussion of Hardware and Software Implementation Options

This invention removes many of the restrictions of traditional Jukeboxes by exploiting the capabilities of digital content and data networks to give users much greater flexibility to choose what music is rendered and corresponding audio is provided in a shared listening acoustical environment. Moreover, it allows multiple users to collectively decide what audio file is played or rendered. The recent developments in computer hardware make this solution inexpensive, thus allowing more people access to this collaborative technology.

Multiple user interfaces are supported, including voice interfacing and remote connections using a normal PC with a Web browser, a notebook with a voice interface, or a PDA (Personal Digital Assistant), with a pen input. In its simplest form, the system operates in a manner analogous to a traditional Jukebox, but with some important differences that will be described in more detail below. Advanced functionality includes user quotas, voting algorithms, memorized lists, and automatic selection of favorite audio files, licensing schemes for protection of copyright and remote listening.

The virtual Jukebox consists of computer hardware and software. The software will run without change on a wide range of general-purpose hardware, including PCs and workstations. Therefore a software only solution is contemplated. However in its preferred embodiment the hardware provides only a minimum set of capabilities, thus reducing the cost and dimensions of the end product.

Throughout this document, the terms "audio file" and "song" are used interchangeably. However, note that not all audio files need be musical pieces. Other audio files that can be used effectively include prerecorded voice messages as well as messages automatically generated using text-to-speech technology. Generally, any audio file can be voted for or against, and can be scheduled for rendering. In addition to music files, these files include timely business, news, sports reports, company announcements, and emergency bulletins. That is, a group can vote indirectly for an audio message. An example is to listen to a midday stock report at noon. The exact contents are not known as the details change each day. It is also noted that this is not a prerecorded audio file but a "live feed."

The Virtual Jukebox Topology

Figure 4:
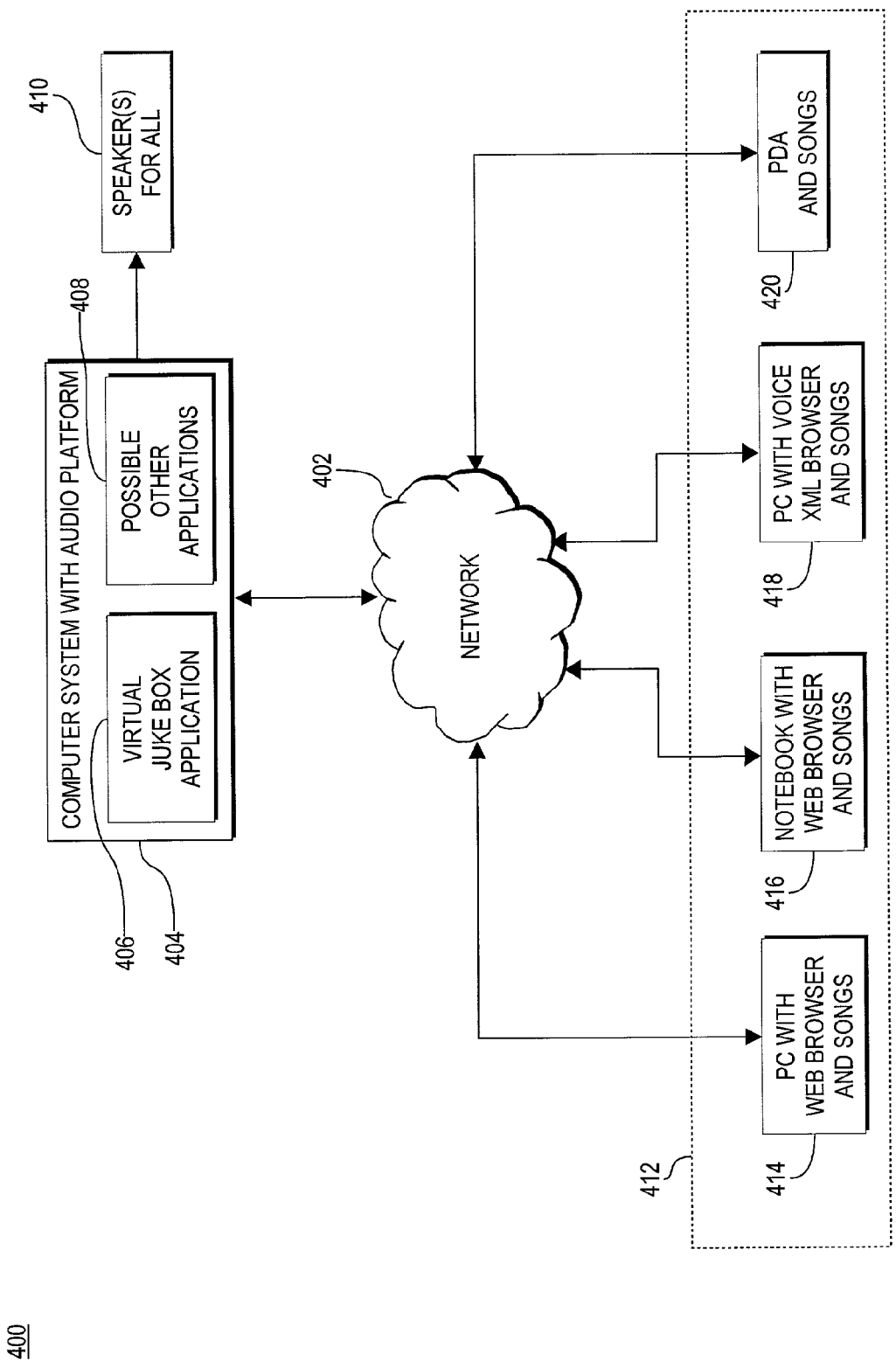
FIG. 4 is a block diagram showing an exemplary Jukebox system according to a preferred embodiment of the present invention.

Turning now to FIG. 4, block diagram 400 illustrates an exemplary network topology for use according to a preferred embodiment of the present invention. A computer system with an audio platform 404 is communicatively coupled via a network 402 to a plurality of networked computing devices 412, all of which have audio listeners in acoustical proximity. The network 402 may be a LAN (Local Area Network)

that is typically installed in a business. Alternatively, the network 402 may comprise a company VPN (Virtual Private Network), an intranet, or the Internet, or any combination of such networks. The computer system with audio platform 404 contains the virtual Jukebox application 406 and possible other applications 408. The audio platform of the computer system 404 controls the speakers for all 410. The plurality of networked computing devices 412 that are connected to the network 402 may be a typical PC with a web browser and stored song files 414, a note book with web browser and stored songs 416, a PC with a voice controlled interface 418, or a PDA (Personal Digital Assistant) with stored songs 420. The networked computing devices 412 are examples and as such should not limit this invention to only these that are shown. Note that although these networked computing devices 412 are illustrated with stored songs, it is not necessary for each of these networked computing devices 412 to have stored songs or for all networked computing devices with stored songs to provide a user interface. In addition, it is not necessary for all of the networked computing devices 412 to be connected or to stay connected for the present invention to operate.

Finally a plurality of listeners, who are typically in acoustical proximity to the virtual Jukebox device, may communicate with the Jukebox and vote through different interfaces. Examples are a typical web browser 414, a voice interface (voice commands and PC voice response) 418, or even a PDA 420 with pen interface.

Turning now to a discussion of copyright protection, the increased availability of compressed digital formats for audio files has presented some new challenges. The Jukebox system may optionally support one of several licensing schemes for playback rendering of copyrighted material. Of particular applicability are schemes that keep track of each copyrighted material and the number of times it is played. By keeping track of the number of times a song is rendered, the Jukebox system can automatically contact the copyright owners and facilitate payment of the corresponding fees for the use of such material. This type of scheme has the advantage of charging for actual use rather than for the right to hold a physical copy of the material.

Another alternative is prepayment of rights to play a song for a fixed number of times. In this case, the copy protection software 524 of FIG. 5 (discussed below) keeps track of how many times the song is played, and rejects requests after that number is expired, unless the rights are renewed. The Jukebox may be configured to automatically purchase rights on demand.

Additionally, many copyright owners make their material available in encrypted form as an additional mechanism for copyright protection. The protection software 524 of FIG. 5 then plays the role, of an authorized music player, and supplies the decryption function if necessary.

Block Diagram of the Virtual Jukebox Device

Hardware Basic Functionality and Options Packaging

Figure 5:
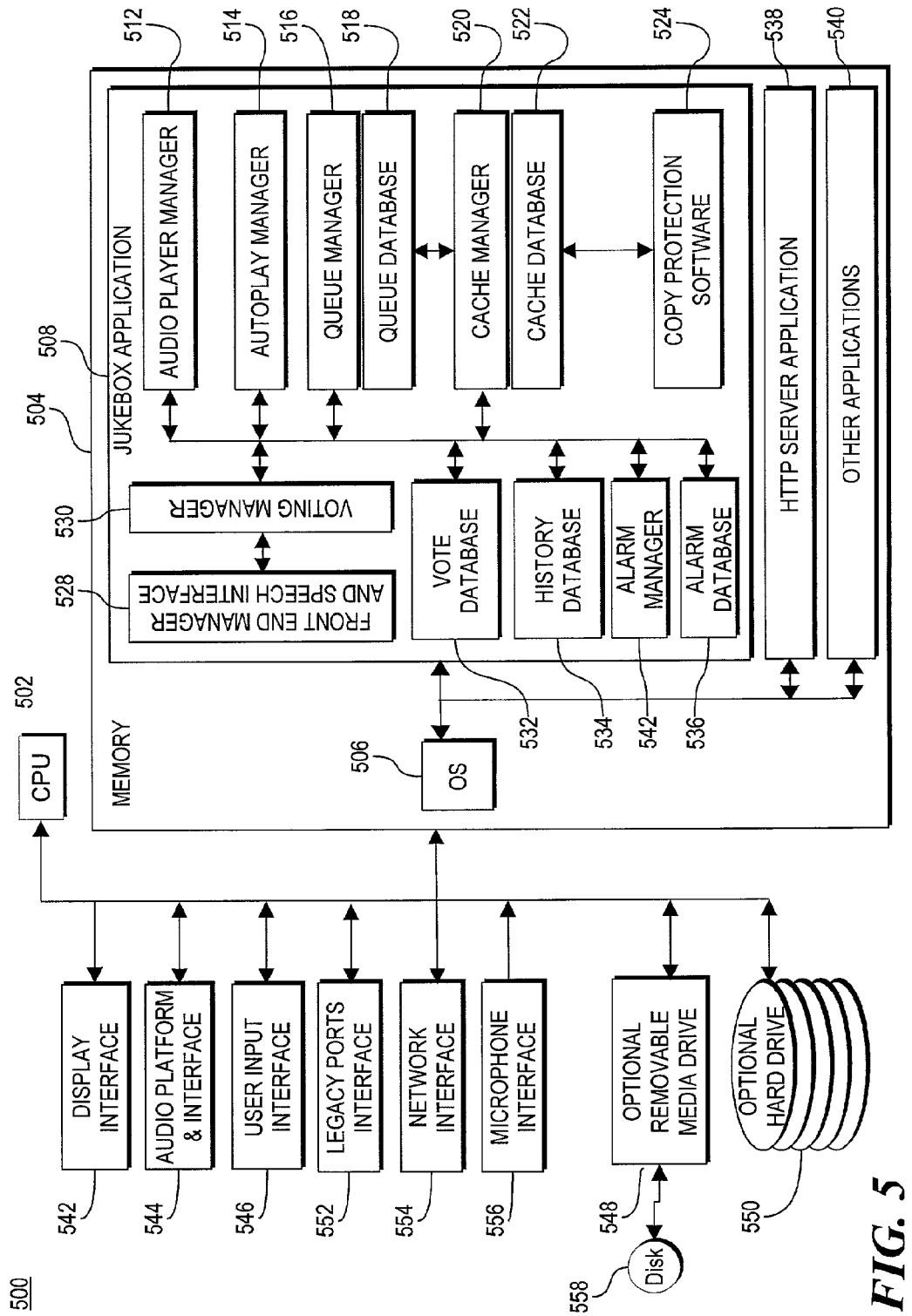
FIG. 5 is a more detailed block diagram of the Jukebox system of FIG. 4 according to a preferred embodiment of the present invention.

Turning now to FIG. 5, virtual Jukebox device 500 includes hardware and software components for implementing the virtual Jukebox functions according to a preferred embodiment of the present invention. The hardware and software components include a processor/controller CPU 502, a memory 504, a network interface 554, an audio playback platform and interface 544 that according to a preferred embodiment of the present invention comprises a sound chip and/or a sound card. This audio platform controls speakers, which may be as simple as one local speaker, a set of speakers for surround sound or a distributed set of speakers in a large environment such as a warehouse. In addition, there is a display interface 542 for driving a display (not shown) that is viewable by a user of the virtual Jukebox device 500, and a user input interface 546. The user-input interface 546 may include a keyboard, a mouse, and/or other device for reviewing user input from a user of the virtual Jukebox device 500. Limited non-volatile storage is also utilized, and can take several forms including hard disks, Flash memory or battery backed up DRAM 550. In order to maintain the OS 506 (operating system) and at least the Jukebox SW (software) application 508 and the vote history lists (explained below) non-volatile memory is preferably utilized. This will allow for Jukebox operation using OS and the Jukebox SW application after power outages and for the contents of the vote history lists to be available.

Additional elements include a power supply, different connectors and an encasing, which are not shown. Optionally, there may be a removable media drive 548 for a CD 558 or other removable media, and support for legacy interfaces such as a serial port 552 and finally a microphone input 556.

Software—Basic Functionality

Virtual Jukebox functions are provided by a combination of software components operating with the hardware platform and components. The basic connectivity framework, including an embedded HTTP server and a subscription mechanism for services, is preferably provided by a Cyber-Hub architecture as taught, for example, in the related co-pending U.S. patent application Ser. No. 09/163,498, entitled "An Extensible Thin Server for Computer Networks", filed on Sep. 30, 1998, which is commonly owned by the assignee of the present patent application and the entire teachings of which are hereby incorporated by reference. This framework supports pluggable software modules (called services) that perform specific functions, and can use other services installed on the same computer system. In addition, the system supports updating services remotely, so that when a new version of a software module becomes available, it can be installed from a remote location via a network communication.

Continuing with FIG. 5, the memory 504, according to the present example, contains components of the Operating System platform 506 that controls applications running on the OS platform 506; the Jukebox application 508, the HTTP server application 538, and other applications 540. These Jukebox applications will be discussed in more detail below.

Within the Jukebox application 508, the front-end manager 528 interfaces with any direct interaction between a user and the Jukebox, controlling certain global functions. The voting manager 530, according to the present example, receives votes from networked devices 412 and then aggregates the votes and performs such checks as maintaining quotas, and performing the summation, which is provided to the vote database 532. The queue database 518 contains queue items arranged in a FIFO order of the requested audio files and is provided to the queue manager 516, which can adjust the order of the audio files listed. This queue manager 516 provides the list of audio files that will be stored in the local cache. The cache manager 520 and its resultant cache database 522 maintains coherency with the queue database 518 and, in this example, pre-fetches the audio files so that no rendering of an audio file will be started unless it is local to the Jukebox. Optionally, as the audio files are requested by the cache, a check is performed by the copy protection software 524 to assure the security of the audio files to be rendered. The Jukebox controls are provided by the audio player manager 512. The Jukebox controls include the volume; left/fright balance, treble, and similar functions of the speakers (not shown).

Additional functions are provided by the history database 534, and the alarm database 536. The history and alarm databases 534 and 536 are used by the voting manager 530. Audio files that have just played may not be played again for H hours where H is programmable. In addition the alarm manager 542 is able to assure the rendering of an audio file at a specific time of day, and the resultant queue database 518 is adjusted accordingly. Additionally the history database 534 is used by the autoplay manager 514 as will be discussed below.

As a result of a lack of song requests from the networked devices 412 over a period of time, the queue database 518 can become empty. Therefore no audio will be scheduled or rendered. When the queue manager 516 detects this scenario the autoplay manager 514 starts.

More advanced features are also possible and can be implemented, without requiring any additional changes to the other elements. The next section describes such features.

Software—Advanced Features

Alarms

Users can select an audio file to be played at a specified time, either only once or every day. More complicated alarm conditions, such as playing on a specific day of the week, are also supported. The Alarm Manager 542 keeps track of the different alarms set by users. When a predetermined time for one of the alarms arrives, as indicated by the internal clock (not shown), the alarm manager 542 adds the alarm URL of the audio file associated with the alarm to the queue database 518. There are two options available to users. If a song is being played when an alarm is due, the manager can either instruct the player to stop playing the current file, play the alarm file, and then continue with the previous file. Or, alternatively, the alarm file is played after the current file is finished. In either case, the alarm manager 542 will cause the cache manager 520 to pre-fetch the audio files to ensure the best response.

Play Lists: Manual and Automatic

Frequent users may store lists of URLs on the Jukebox, such that multiple songs may be selected as a play list to be played at future times. This simple addition significantly increases the usability, since it is no longer necessary to add songs one by one. Saving the named lists on the Jukebox does not require significant storage space, since only the URLs and not the audio files themselves are stored.

An advanced capability includes the automatic generation of play lists. The Jukebox tracks the most popular selections for the user group that accesses the Jukebox by observing the patterns of choices made by users. Other preferences detected automatically may include time of day when certain audio files are played. In this way, the Jukebox learns the preferences of its users and, unless instructed to behave differently, may decide on its own what files to play or render.

Audio Streaming

Several mechanisms exist for data streaming, and in particular for media streaming. Any of such mechanisms could be used with this invention. Media streaming, for example, allows the transmission of digital content under timing control. Moreover, transmission of a first portion of digital content may occur while a second portion of the digital content is being rendered and/or played back to users. Of course, an alternative embodiment of the present invention comprises sending a copy of a digital file from a first location to a second location and then playing that file to provide the audio locally for the benefit of all local listeners, such as at the second location. Data streaming allows for a sever to send parts of the file together with timing information to a client (usually a "player") that can process (play) the data according to the timing requirements. According to a preferred embodiment of the present invention, a virtual Jukebox acts as a streaming client, playing selected songs to all listeners within local audio listening range.

Requesting a Song at the Networked Computing Device Location

Figure 6:
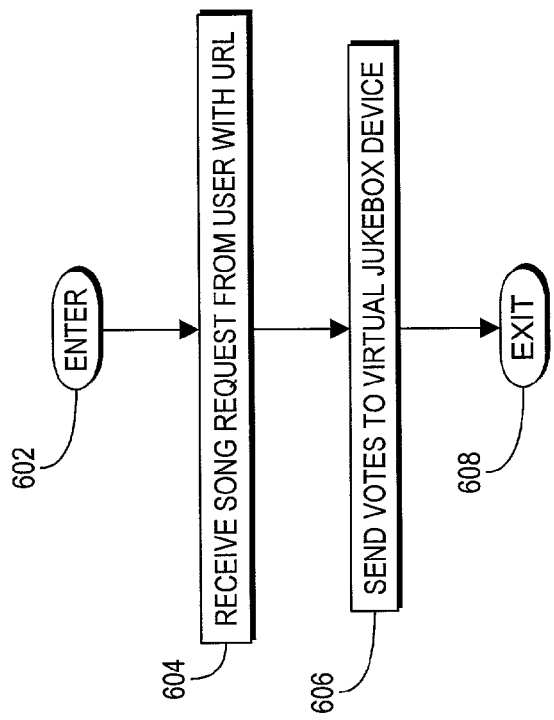
FIG. 6 is a flow diagram illustrating an operational sequence at a networked computing device in accordance with a preferred embodiment of the present invention.

Turning now to FIG. 6, flow diagram 600 shows simple requesting of a song at a networked device 412 such as shown in FIG. 4, according to a preferred embodiment of the present invention. The user decides to request a particular song and enters the flow at step 602, by entering the URL (Uniform Resource Locator) of the song at step 604. This URL is typically on the local network, but it may in fact be anyplace specific. That is, the URL may be a tag to a location on a particular PC's hard drive on the LAN or it may be a particular location on the Internet. The networked device 412 receives user input and then sends the request to the virtual Jukebox device 500 at step 606. This flow is then exited at 608. Alternatively, the user may enter the request by selecting one that is listed as available on the network.

The virtual Jukebox device 500 receives the request for a particular song from the networked device and enters it into the queue database 518. This queue database 518 contains information about the song and also the location of the song file. Note that a given song may exist on several networked devices 412, and alternative preferred embodiments of the present invention allow a choice of the location of a source of an audio file while providing a pointer to the alternative location(s) as a backup. A location is typically defined by a URL, which enables the Jukebox device 500, to know where the audio file is for loading into the cache database 522 of FIG. 5 for playing. If the source for the scheduled audio file is unavailable because the networked device has disconnected from the network, a backup copy on the network will be searched for. If no alternative URL is found then the scheduled song is cast off the queue database 518.

Vote Collection at the Virtual Jukebox

Figure 7:
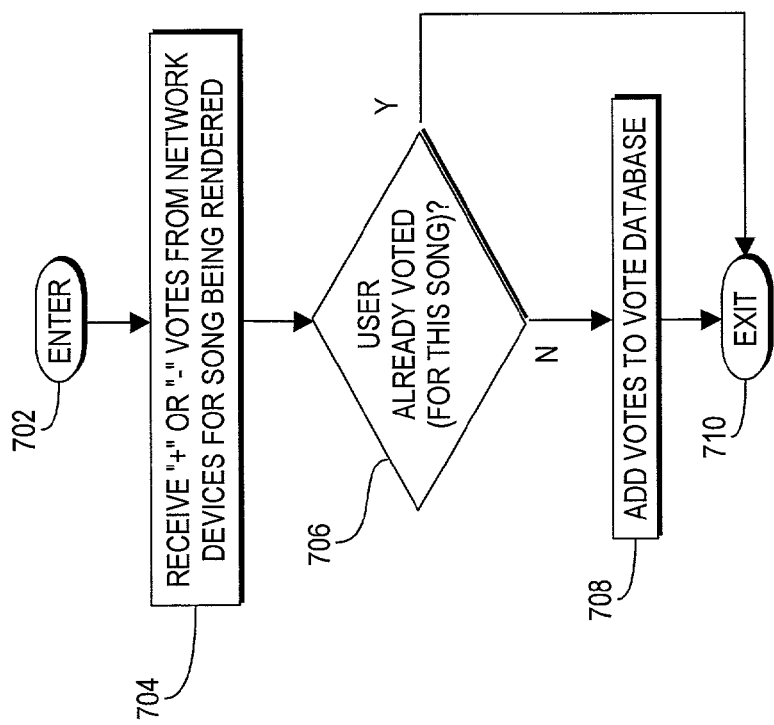
FIG. 7 is a flow diagram illustrating a first operational sequence at the Jukebox system of FIG. 5 according to a preferred embodiment of the present invention.

Turning now to FIG. 7, illustrated is a flow diagram 700, which contains the vote handling and summation at the Jukebox device 500 according to a preferred embodiment of the present invention. The flow is entered at step 702, according to the example, when the Jukebox device starts to play a song. Each of the client devices 412 may send one vote for the song currently playing. The Jukebox device 500 receives the votes 704 from all of the client devices 412 that voted. The Jukebox autoplay manager 514 then checks if the user already voted (for this song) at step 706. These votes may be for or against a song ("+" or "−"). If the vote that is entered is in fact more than the one vote per song allowed, then the vote is not counted and the flow is exited at step 710. If the vote is allowed, at step 706, the vote is added at step 708 to the vote database 532 and the flow is exited at step 710. In addition, if enough votes (to meet or exceed a programmable voting threshold, taken to be 50% herein by example) are received against a song that is being played, then the song is interrupted and the next song in the queue database 518 is played. A general process includes rendering an audio file, and receiving via the network a message from a networked device 412. The received message comprises one of the following: 1) a vote for the audio file being rendered, and 2) a vote against the audio file being rendered. The virtual jukebox provides a relative vote indication corresponding to a summation of received votes relating to the audio file being rendered. The relative vote indication can be, for example, a summation of votes, or a ratio of summation of votes, or other such mechanism that will indicate the relative vote for or against a particular audio file being rendered. The virtual jukebox compares the relative vote indication to a voting threshold, and then stops the rendering of the audio file if the relative vote indication does not meet or exceed the voting threshold. Contemporaneous with the audio file being rendered, according to a preferred embodiment, the virtual jukebox operates with a sound system to provide audio in a shared acoustical environment, the audio corresponding to the audio file being rendered.

The vote database 532 is used by the autoplay manager 514 to play the songs in the absence of requests. In effect, the Jukebox "learns" the preferences of the users. (This will be explained below.) The given voting algorithm only represents one possible scheme to determine the popularity of a song and the fact that enough clients want the playback of the song to be stopped. Other voting algorithms may be used as may be appreciated by those of ordinary skill in the art in view of the present discussion.

This completes the description of the exemplary process for requesting, queuing, voting on, and playing songs.

Flow Diagram For An Autoplay Manager

Figure 8:
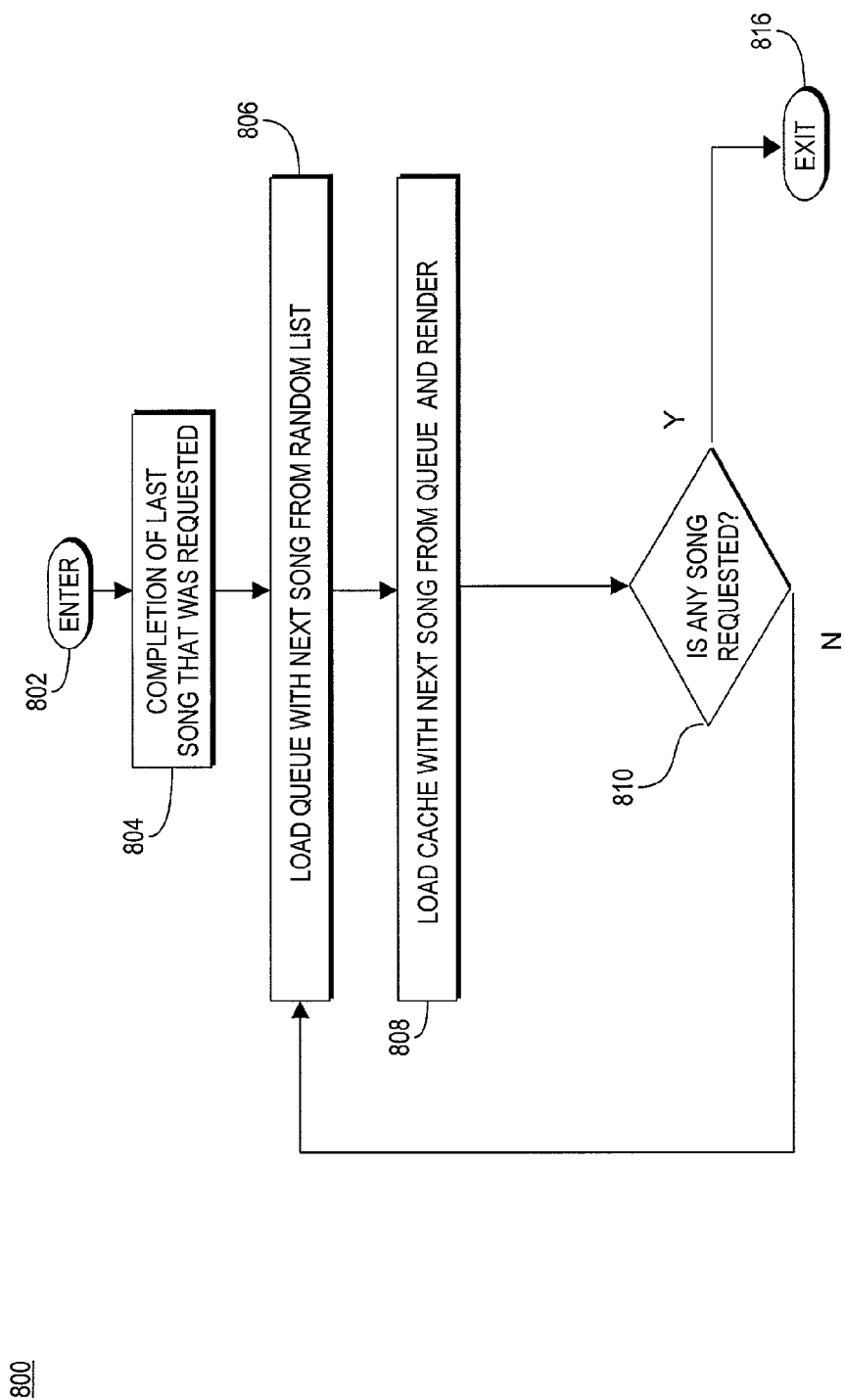
FIG. 8 is a flow diagram illustrating a second operational sequence at the Jukebox system of FIG. 5 according to a preferred embodiment of the present invention.

Turning now to FIG. 8, an exemplary operational sequence 800 illustrates an autoplay manager 514 according to a preferred embodiment of the present invention. An autoplay manager 514 operational sequence is entered, at step 802, when the last requested song on the queue database 518 is completed at step 804. The autoplay manager 514 determines the next song to play using the vote database 532 employing a randomly selected list 806 (explained below). This selection is placed in the queue database 518 and then is loaded into the cache database 522 and rendered at step 808. After the song is rendered, a check is performed to see if the queue database 518 has a song request in it at step 810. If there is a requested song at step 810, the auto play operational sequence exits at step 816. If no song has been requested at step 810 the queue database 518 is loaded with another randomly selected song from a randomly selected list at step 806.

Alternatively, this sequence of checking for requested songs may be triggered by other conditions, such as when the last song in the queue database 518 starts to play, to ensure smooth transitions from the normal mode of operation to the autoplay mode. The autoplay manager 514 automatically selects a song to be added to the queue database 518 based on a method described below and illustrated in FIG. 9b.

The condition that triggers the autoplay sequence is checked at the end of playback of each song, and said sequence is repeated whenever the condition is met. This ensures that as long as users are explicitly making requests, these requests will be played. It is only when no selections are pending that the virtual jukebox engages the autoplay sequence. Although an exemplary operational sequence for the autoplay manager 514 has been discussed above, other alternative embodiments of the autoplay manager 514 may be implemented in the virtual jukebox as may be appreciated by those of ordinary skill in the art in view of the present discussion.

Turning now to FIG. 9, illustrated is a description 900 of the voting database lists and how these lists are used to select audio files automatically. FIG. 9a shows three exemplary lists that represent audio files that have been voted for. Although three lists are being shown, more lists may be used in accordance with preferred embodiments of the present invention. The central list 902 represents a list of audio files that have been requested. The height of this bar illustrates the audio files receiving a normal or average number of votes. The higher bar 904 is intended to illustrate audio files receiving higher number of votes. Audio files have been moved to this list from the requested audio files list 902 because these audio tiles have received favorable votes for them beyond a certain threshold such as during the time that they were played. The threshold may be programmable and set to different values, while it is taken to be 50% in the present example. The lower bar 906 is intended to illustrate audio files in this example receiving unfavorable votes. Audio files have been moved to this list 906 from the requested audio files list 902 because these audio files have received unfavorable votes for them beyond a certain threshold during the time that they were played.

Turning now to FIG. 9b, illustrated is a flow diagram 806 of the selection of an audio file for the autoplay manager 514. The flow is entered at step 908 when all requested audio files have been rendered or played. A random number is generated at step 910 and is used with a weighted function to select at step 912 one of the lists 902–906 from the group of lists FIG. 9a. The weighting is towards the most voted for list 904. However any weighting may be used. An additional random number in this example is generated at step 914, and this number is used with a weighted function to select a song from the selected list at step 916. The weighting may be set to select songs that have not been played or rendered recently or songs that have more votes on this particular given list. In fact these weighting factors are programmable and may be changed over time. Finally the URL for the selected song from the selected list is sent at step 918 to the queue database 518, and the operational flow is exited at step 920.

Exemplary Architecture

Preferred Embodiment 1

In this preferred embodiment, a virtual Jukebox is implemented using the minimum possible computing resources (as described in a previous section.) It consists of a CPU with some amount of memory, minimum storage capabilities, a sound card, speakers and a network connection. Its intended use is as a network addressable player that can handle requests from single or multiple users.

If a single user is accessing the virtual Jukebox, he or she can select the music to be played by indicating a list of files available on the network. For private use such as in the home, this would allow a person to select music independently of the location where the files are stored. Because the players are designed to be inexpensive, a user may own several virtual Jukeboxes and place them in different rooms of the house. Then, he or she could program from a single location the music to be played on each Jukebox, while having all files stored on a personal computer or network-attached storage (NAS.)

When more than one person wants to listen to the music being played on a given Jukebox, like in a shared office or home environment or other such environment (generally referred to as a shared acoustical environment), they may do so by simply adding songs to the queue database 518. The files in which the content is encoded, which could consist of the personal musical collections of each user, may reside on multiple devices on the network, such as on each person's PC or on a server. The advanced features described above, such as voting, quotas or automatic playback of preferred tracks, allow for complex collaborative decisions that have at the same time a simple user interface.

A preferred embodiment of the present invention keeps track of the usage by analyzing the history of requests with which users could "train" the virtual Jukebox to learn their preferences. For example, users around an office space who share an interest in a particular genre or artist could connect to this Jukebox regularly. The more they use it, the better it knows what the users' preferences are, and the better it can program itself without the need for specific actions on the part of the users.

Copyright Considerations

The copyright licensing schemes could be used to protect the copyright owners from abuse. For example, each time a song is played, the copyright owner could be contacted and a licensing fee paid. Alternatively, multiple transactions could be batched. Note that this allows for more flexible business models. For instance, fees could vary with the numbers of users currently connected. Additionally the system could optionally report usage information valuable to the record labels.

Computer Readable Version of the Present Invention

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following: a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. A computer readable storage medium may include non-volatile memory, such as ROM, Flash memory, disk chive memory, CD-ROM, and other permanent storage. Additionally, the computer readable storage medium may include, for example, volatile storage such as RAM, buffers, cache memory, and network circuits. Furthermore, a transmission computer readable medium may comprise computer readable information in a transitory state medium such as a network link and/or a network interface, including a wired network or a wireless network, that allows a computer to read such computer readable information.

Although specific embodiments of the invention have been disclosed, those having ordinary skill in the art will understand that changes can be made to specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of operating a virtual jukebox by a group of persons, comprising the steps of:

receiving, at a virtual jukebox device that is communicatively coupled to networked devices via a network interface, at least one playback request from at least one of the networked devices for rendering at least one audio file, each of the networked devices being operated by at least one person of the group of persons;

storing the received at least one playback request in a queue in the virtual jukebox device;

requesting a copy of the at least one audio file associated with the at least one playback request;

storing the copy of the requested at least one audio file in the virtual jukebox device;

rendering the stored copy of the requested at least one audio, file by the virtual jukebox device;

contemporaneously with the step of rendering, receiving at the virtual jukebox device, from the networked devices via the network interface, at least one vote for or against the at least one audio file; and based upon an aggregate summation of the at least one vote received, providing audio to the group of persons in a shared acoustical environment, the audio corresponding to the at least one audio file being rendered.

2. The method of claim 1, wherein the at least one playback request received from the at least one networked device comprises an indication of location of the associated at least one audio file.

3. The method of claim 2, wherein the indication of location of the associated at least one audio file comprises at least one URL (Uniform Resource Locator) for the at least one audio file.

4. The method of claim 1, wherein the step of storing the received at least one playback request in the queue comprises the step of storing in the queue at least one queue item associated with the at least one associated audio file, respectively, wherein each of the at least one queue item includes a count of the number of times that an associated audio file has been requested.

5. The method of claim 1, further comprising the step of arranging the received at least one playback request in the queue in a first-in-first-out order.

6. The method of claim 1, wherein the step of requesting a copy of the at least one audio file associated with the at least one playback request comprises the step of requesting a copy of the at least one audio file from a networked device via the network interface.

7. The method of claim 6, wherein the step of requesting a copy of the at least one audio file from a networked device is accomplished in time for rendering at least a portion of the requested at least one audio file.

8. The method of claim 1, further comprising, after the step of rendering the stored copy of the requested at least one audio file, the step of removing from the queue the at least one playback request associated with the rendered at least one audio file.

9. The method of claim 1, further comprising the steps of:

totaling the received at least one vote for or against the at least one audio file;

calculating the percent of votes for an audio file currently being rendered relative to the total votes received for and against the audio file;

comparing the calculated percent to a threshold; and stopping the rendering of the audio file currently being rendered if the comparison does not meet or exceed the threshold.

10. A method, comprising the steps of:

rendering an audio file;

receiving via a network a message from a networked device, the message comprising one of the following: a vote for the audio file being rendered, and a vote against the audio file being rendered;

providing a relative vote indication corresponding to a summation of received votes relating to the audio file being rendered;

comparing the relative vote indication to a voting threshold;

stopping the rendering of the audio file if the relative vote indication does not meet or exceed the voting threshold; and contemporaneous with the step of rendering the audio file, providing audio in a shared acoustical environment, the audio corresponding to the audio file being rendered.

11. The method of claim 10, further comprising the step of requesting a copy of the audio file from a networked device via a network interface.

12. A computer readable storage medium including computer instructions for operating a virtual jukebox system, the computer instructions comprising instructions for:

rendering an audio file;

receiving via a network a message from a networked device, the message comprising one of the following:
a vote for the audio file being rendered, and
a vote against the audio file being rendered;

providing a relative vote indication corresponding to a summation of received votes relating to the audio file being rendered;

comparing the relative vote indication to a voting threshold;

stopping the rendering of the audio file if the relative vote indication does not meet or exceed the voting threshold; and contemporaneously with rendering the audio file, providing audio in a shared acoustical environment, the audio corresponding to the audio file being rendered.

13. A computer readable storage medium of claim 12, further comprising computer instructions for:

requesting a copy of the audio file from a networked device via a network interface.

14. A virtual jukebox system for listening to a same audio file by all listeners of a group of listeners, the virtual jukebox system including a single set of speakers through which all listeners of the group can hear the same audio file, comprising:

a network interface for communication with at least one networked device;

an audio platform interface for rendering audio files;

data memory comprising a queue for storing at least one playback request from at least one networked device for rendering at least one audio file corresponding to the at least one playback request;

a program memory;

a processor/controller, electrically coupled to the network interface, the data memory, and the program memory;

a queue manager, electrically coupled to the program memory, for managing the queue;

an audio player manager, electrically coupled to the program memory, for:
requesting a copy of the at least one audio file corresponding to the at least one playback request,
storing the copy of the requested at least one audio file in the data memory,
rendering the stored copy of the requested at least one audio file, and
providing audio in a shared acoustical environment, the audio corresponding to the at least one audio file being rendered; and a voting manager, electrically coupled to the program memory, for receiving, from the at least one networked device via the network interface, at least one vote for or against the at least one audio file.

15. The virtual jukebox system of claim 14, wherein the audio player manager renders the stored copy of the requested at least one audio file contemporaneously with the voting manager receiving the at least one vote for or against the at least one audio file being rendered.

16. The virtual jukebox system of claim 14, wherein the audio player manager requests a copy of the at least one audio file corresponding to the at least one playback request from a networked device.

17. The virtual jukebox system of claim 14, further comprising an autoplay manager, electrically coupled to the program memory, for
storing a list of previously rendered audio files, the audio files having been rendered in response to received playback requests from networked devices;
selecting an audio file from the list of previously rendered files; and
after the rendering of all audio files associated with playback requests has been completed, rendering the selected audio file.

18. The virtual jukebox system of claim 14, wherein the autoplay manager stops selecting an audio file when a request for an audio file is received.

19. The virtual jukebox system of claim 14, further comprising a list of lists, each of the individual lists containing at least one list item corresponding to at least one song that has been rendered by a virtual jukebox system, the at least one song further being associated with
a number of votes for and against the at least one song that were cast during its rendering, and
a time of last rendering.

20. A virtual jukebox system for allowing multiple users to collectively decide upon listening to a same audio file at a same time in a shared acoustical environment, comprising:
a plurality of networked devices, each networked device associated with a user; and
a virtual jukebox device, the virtual jukebox device including
a speaker;
a processor coupled to the speaker;
a network interface, coupled to the processor, for communication with the plurality of networked devices; and
a memory, coupled to the processor, for storing audio files, the memory further including a virtual jukebox application for
receiving a playback request for an audio file from at least one of the plurality of networked devices,
receiving from the plurality of networked devices, at least one vote for or against the playback request,
requesting from the memory a copy of the audio file corresponding to the playback request, and, in response to votes, and
providing audio in the shared acoustical environment through the speaker by which all users can hear the same audio at the same time, the audio corresponding to the audio file of the playback request.

21. The virtual jukebox system of claim 20, in which, while the audio is being provided, the virtual jukebox application is also for
receiving from the plurality of networked devices, at least one vote for or against continuation of providing of the audio of the playback request, and
in response to the continuation votes, stopping the providing of the audio.

* * * * *